United States Patent
Zhang et al.

(10) Patent No.: US 9,879,979 B2
(45) Date of Patent: Jan. 30, 2018

(54) HETERODYNE GRATING INTERFEROMETER DISPLACEMENT MEASUREMENT SYSTEM

(71) Applicant: TSINGHUA UNIVERSITY, Beijing (CN)

(72) Inventors: Ming Zhang, Beijing (CN); Yu Zhu, Beijing (CN); Leijie Wang, Beijing (CN); Jinchun Hu, Beijing (CN); Longmin Chen, Beijing (CN); Kaiming Yang, Beijing (CN); Dengfeng Xu, Beijing (CN); Wensheng Yin, Beijing (CN); Haihua Mu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 279 days.

(21) Appl. No.: 14/441,821

(22) PCT Filed: Oct. 28, 2013

(86) PCT No.: PCT/CN2013/086029
§ 371 (c)(1),
(2) Date: May 8, 2015

(87) PCT Pub. No.: WO2014/071807
PCT Pub. Date: May 15, 2014

(65) Prior Publication Data
US 2015/0338205 A1    Nov. 26, 2015

(30) Foreign Application Priority Data

Nov. 9, 2012  (CN) .......................... 2012 1 0449244

(51) Int. Cl.
*G01B 9/02* (2006.01)
*G01B 11/14* (2006.01)
(Continued)

(52) U.S. Cl.
CPC .......... *G01B 11/14* (2013.01); *G01B 9/02002* (2013.01); *G01B 9/02007* (2013.01);
(Continued)

(58) Field of Classification Search
CPC ............ G01B 9/02002; G01B 9/02003; G01B 9/02007; G01B 9/02011; G01B 2290/70; G01D 5/266; G01D 5/38
(Continued)

(56) References Cited

U.S. PATENT DOCUMENTS

| | | | | | |
|---|---|---|---|---|---|
| 5,331,400 | A | * | 7/1994 | Wilkening | ................ G01J 9/04 356/487 |
| 5,504,619 | A | * | 4/1996 | Okazaki | .................. B41B 19/00 359/489.07 |

(Continued)

FOREIGN PATENT DOCUMENTS

| | | |
|---|---|---|
| CN | 1869658 A | 11/2006 |
| CN | 201413130 Y | 2/2010 |
| JP | H09-138110 A | 5/1997 |

OTHER PUBLICATIONS

DeLange, O.E. "Optical heterodyne detection". IEEE spectrum, Oct. 1968, pp. 77-85.*
(Continued)

*Primary Examiner* — Michael A Lyons (57) ABSTRACT

A displacement measurement system of heterodyne grating interferometer, comprises a reading head, a measurement grating and an electronic signal processing component. Laser light emitted from the laser tube is collimated, passes through the first polarization spectroscope, and then emits two light beams with an orthogonal polarization direction and an orthogonal propagation direction; the two light beams pass through two acousto-optic modulators and respectively generate two first-order diffraction light beams with different frequencies, which are later divided into
(Continued)

reference light and measurement light; two parallel reference light beams form a beat frequency electric signal with positive and negative first-order diffraction measurement light respectively after passing through a measurement signal photo-electric conversion unit; the beat frequency signals are transmitted to the electronic signal processing component for signal processing, thus the output of linear displacement in two directions is realized.

9 Claims, 7 Drawing Sheets

(51) Int. Cl.
  *G01D 5/26* (2006.01)
  *G01D 5/38* (2006.01)
(52) U.S. Cl.
  CPC ......... *G01B 9/02011* (2013.01); *G01D 5/266* (2013.01); *G01D 5/38* (2013.01); *G01B 2290/70* (2013.01)
(58) Field of Classification Search
  USPC .................................................. 356/487, 488
  See application file for complete search history.

(56) References Cited

U.S. PATENT DOCUMENTS

| | | | |
|---|---|---|---|
| 5,818,588 A * | 10/1998 | Matsumoto | G01D 5/266 356/487 |
| 6,628,402 B1 * | 9/2003 | Yamaba | G01B 11/0608 356/489 |
| 7,009,710 B2 * | 3/2006 | Sullivan | G01B 9/02007 356/477 |
| 7,102,729 B2 | 9/2006 | Renkens et al. | |
| 2007/0206198 A1 * | 9/2007 | Serikawa | G01B 11/306 356/487 |
| 2011/0096334 A1 * | 4/2011 | Ishizuka | G01B 9/02003 356/484 |
| 2015/0268031 A1 * | 9/2015 | Zhu | G01D 5/38 356/486 |

OTHER PUBLICATIONS

Kimura, Akihide et al. "Design and construction of a two-degree-of-freedom linear encoder for nanometric measurement of stage position and straightness". Precision Engineering 34 (2010), available online Jul. 18, 2009, pp. 145-155.*

International search report for PCT/CN2013/086029 filed on Oct. 28, 2013.

* cited by examiner

HETERODYNE GRATING INTERFEROMETER DISPLACEMENT MEASUREMENT SYSTEM

TECHNICAL FIELD OF THE INVENTION

The present invention relates to a grating measurement system, and particularly to a heterodyne grating interferometer measurement system.

BACKGROUND OF THE INVENTION

As a typical displacement sensor, the grating measurement system is widely applied to various kinds of mechanical and electrical equipment. The measuring principle of the grating measurement system is mainly based on the moire principle and the diffraction and interference principle. As a maturely developed displacement sensor, the grating measurement system based on the moire principle becomes the first choice of displacement measurement for various mechanical and electrical equipments due to its such advantages as high-resolution, high-precision, low cost, easy installation and adjustment, and etc.

A lithography machine in semiconductor manufacturing equipment is key equipment in the production of semiconductor chip. An ultra-precision workpiece table is a core subsystem of the lithography machine and is used for carrying mask plates and wafers to complete high-speed ultra-precision stepping scanning motion. The ultra-precision workpiece table becomes the most typical kind of system in ultra-precision motion systems due to its such motion characteristics as high speed, high acceleration, large stroke, ultra-precision, multi-DOF (degrees of freedom), and etc. To achieve the above motion, the ultra-precision workpiece table usually adopts a dual-frequency laser interferometer measurement system to measure the multi-DOF displacement of the ultra-precision workpiece table. However, along with the continuous improvements of such motion indexes as measurement accuracy, measure distance, measurement speed and etc., the dual-frequency laser interferometer is difficult to meet the measurement demands due to such a series of problems as environmental sensitivity, difficulty for improving measurement speed, space occupation, expensive price, difficulty for designing, manufacturing and controlling a measurement target workpiece table, etc.

With respect to the above problems, various large companies and research institutions in the ultra-precision measurement field worldwide have launched a series of studies, which have focused on the grating measurement system based on the principle of diffraction and interference, and the research progresses have been published in many patents and papers. Dutch ASML's U.S. Pat. No. 7,102,729 B2 (Publishing date, Aug. 4, 2005), U.S. Pat. No. 7,483,120 B2 (Publishing date, Nov. 15, 2007), U.S. Pat. No. 7,940,392 B2 (Publishing date, Dec. 24, 2009), Publication No. US2010/0321665 A1 (Publishing date, Dec. 23, 2010) disclose a plane grating measurement system and arranging scheme applied to an ultra-precision workpiece table of a lithography machine. The measurement system mainly adopts a one-dimensional or two-dimensional plane grating in cooperation with a reading head to measure large-stroke horizontal displacement of the workpiece table, the height direction displacement measurement adopts such height sensors as eddy current or interferometer, but the application of several kinds of sensors limits the measurement preciseness of the workpiece table. American ZYGO company's U.S. Patent Publication No. US2011/0255096 A1 (Publication date, Oct. 20, 2011) discloses a grating measurement system applied to an ultra-precision workpiece table of a lithography machine. The measurement system also adopts a one-dimensional or two-dimensional grating in cooperation with a reading head to achieve displacement measurement, which can perform horizontal and vertical displacement measurements at the same time. Japanese CANON company's U.S. Patent Publication No. US2011/0096334 A1 (Publication date, Apr. 28, 2011) discloses a heterodyne interferometer. The interferometer uses a grating as a target mirror, but the interferometer can only achieve one-dimensional measurement. Japanese scholar GAOWEI proposes, in the research paper "*Design and construction of a two-degree-of-freedom linear encoder for nanometric measurement of stage position and straightness. Precision Engineering* 34 (2010) 145-155", a single-frequency two-dimensional grating measurement system using the principle of diffraction and interference. The grating measurement system can at the same time achieve horizontal and vertical displacement measurements, but due to the use of single-frequency laser, the measured signal is susceptible to disturbances, and it is difficult to guarantee the preciseness.

In order to address the above limitations of the above mentioned technical solutions, a heterodyne grating interferometer measurement system using the principle of optical beat frequency is sought. The measurement system can achieve sub-nanometer or even higher resolution and preciseness, and can at the same time measure large-stroke horizontal displacement and vertical displacement. Adopting the measurement system as an ultra-precision workpiece table displacement measurement device can effectively improve the shortage of a laser interferometer measurement system in the application to the ultra-precision workpiece table, enhancing the performance of the ultra-precision workpiece table of the lithography machine.

SUMMARY OF THE INVENTION

An object of the present invention is to provide a heterodyne grating interferometer measurement system which can achieve a sub-nanometer or even higher resolution and preciseness and can at the same time measure large-stroke horizontal displacement and vertical displacement.

The technical solution of the present invention is as follows.

A displacement measurement system of heterodyne grating interferometer, characterized in that it comprises a reading head 1, a measurement grating 2 and an electronic signal processing component 3;

the reading head 1 comprises a dual-frequency laser generator 11, an interferometer 12, a reference signal photoelectric conversion unit 13 and a measurement signal photoelectric conversion unit 14;

the dual-frequency laser generator 11 comprises a laser tube 111, a first polarization beam splitter 112, an acousto-optic modulator, a reflective mirror, a polaroid and a beam splitter 113;

the interferometer 12 comprises a second polarization beam splitter 121, a wave plate, a refraction element 123 and a reflector 124;

laser light emitted from the laser tube 111 is collimated, and then passes through the first polarization beam splitter 112, and is split into two light beams with polarization directions orthogonal to each other and propagation directions orthogonal to each other; the two light beams pass through two acousto-optic modulators and respectively generate two first-order diffraction light beams with different frequencies; the two first-order diffraction light beams are reflected by the reflective mirrors and pass through the polaroid and reach the beam splitter 113 to be split and then the split light beams are respectively combined; and then, one exit of the beam splitter 113 emits a dual-frequency laser beam onto the reference signal photo-electric conversion unit 13 to form a reference signal, while the other exit emits a dual-frequency laser beam onto a second polarization beam splitter 121; and the dual-frequency laser emitted from one exit of the beam splitter 113 passes through the second polarization beam splitter 121 to be split into reference light and measurement light; the reference light passes through a reference arm ¼ wave plate 122' and is reflected by a reference arm reflector 124 to generate two parallel reference light beams; the two parallel reference light beams pass through the reference arm ¼ wave plate 122' and the second polarization beam splitter 121 to be incident into the measurement signal photo-electric conversion unit 14, respectively; the measurement light passes through a measurement arm ¼ wave plate 122 and a refraction element 123 to be incident onto the measurement grating 2 to be diffracted; positive and negative first-order diffraction measurement light beams pass through the refraction element 123, the measurement arm ¼ wave plate 122 and the polarization beam splitter 121 to be incident into the measurement signal photo-electric conversion unit 14, respectively; the two parallel reference light beams are combined with positive and negative first-order diffraction measurement light respectively and are converted into beat frequency electric signals by the measurement signal photo-electric conversion unit 14; and the beat frequency electric signals are transmitted to the electronic signal processing component 3 for signal processing; and, when the reading head 1 moves in X and Z directions relative to the measurement grating 2, the electronic signal processing component 3 outputs signals of linear displacements in the two directions.

A preferred technical solution of the present invention is that the reference signal photo-electric conversion unit 13 and the measurement signal photo-electric conversion unit 14 constitute a receiver 4, and the light emitted from the beam splitter 113 and the two parallel light beams emitted from the polarization beam splitter 121 are transmitted to the receiver 4 via the optical fiber, respectively.

Another preferred technical solution of the present invention is that the receiver 4 and the electronic signal processing component 3 form an integral structure 5.

In the above mentioned technical solution, the reflector 124 is composed of a reference gating 1241 and reflective mirrors 2a, and the reference light is incident onto the reference gating 1241 to be subject to diffraction reflection and then reflected by the reflective mirrors 2a to form two parallel light beams; or, the reflector 124 is composed of a reference gating 1241 and a lens 2b, and the reference light is incident onto the reference gating 1241 to be subject to diffraction reflection and then passes through the lens 2b to form two parallel light beams; or, the reflector 124 is composed of a reference gating 1241 and prisms 2c, and the reference light is incident onto the reference gating 1241 to be subject to diffraction reflection and then passes through the prisms 2c to form two parallel light beams; or, the reflector 124 comprises a rectangular prism 1242, the cross section of the rectangular prism is composed of a right-angle trapezoid and an isosceles right triangle, the jointing plane between the right-angle trapezoid and the isosceles right triangle is a light splitting plane, the reference light is incident onto the light splitting plane of the rectangular prism 1242 to be split into two light beams, which are reflected by a 45° reflective plane, respectively, to form two parallel light beams.

The refraction element 123 described by the present invention comprises reflective mirrors 2a, a lens 2b or prisms 2c.

The reference signal photo-electric conversion unit 13 described by the present invention is composed of an analyzer 2d and a first photo-electric detection unit 131; and the measurement signal photo-electric conversion unit 14 is composed of an analyzer 2d, a second photo-electric detection unit 142 and a third photo-electric detection unit 143.

The displacement measurement system of heterodyne grating interferometer provided by the present invention has the following advantages and prominent effects: it can achieve sub-nanometer or even higher resolution and preciseness and can at the same time measure large-stroke horizontal displacement and vertical displacement; the reading head of the measurement system has a small size and a light weight, is easy to install, and is convenient for use; in addition to meeting measurement needs, the displacement measurement system of heterodyne grating interferometer, as an ultra-precision workpiece table measurement system for a lithography machine can effectively reduce the size and weight of the workpiece table, lowers disturbance of the measurement system to the cabling of the workpiece table, and improve the dynamic performance of the workpiece table, comprehensively improving the overall performance of the workpiece table.

1 reading head

2 measurement grating 3 electronic signal processing component
4 receiver
5 integral structure
11 dual-frequency laser generator
12 interferometer
13 reference signal photo-electric conversion unit
14 measurement signal photo-electric conversion unit
111 laser tube
112 first polarization beam splitter
113 beam splitter
121 second polarization beam splitter
122 measurement arm ¼ wave plate
122' reference arm ¼ wave plate
123 refraction element
124 reflector
1241 reference gating
1242 rectangular prism
131 first photo-electric detection unit
141 second photo-electric detection unit
142 third photo-electric detection unit
2a/3a reflective mirror
2b/3b lens
2c/3c prism
2d/3d/3e analyzer

DETAILED DESCRIPTION OF EMBODIMENTS OF THE INVENTION

The structure, principle and specific implementation mode of the present invention will be further detailed below in conjunction with the drawings.

Figure 1:
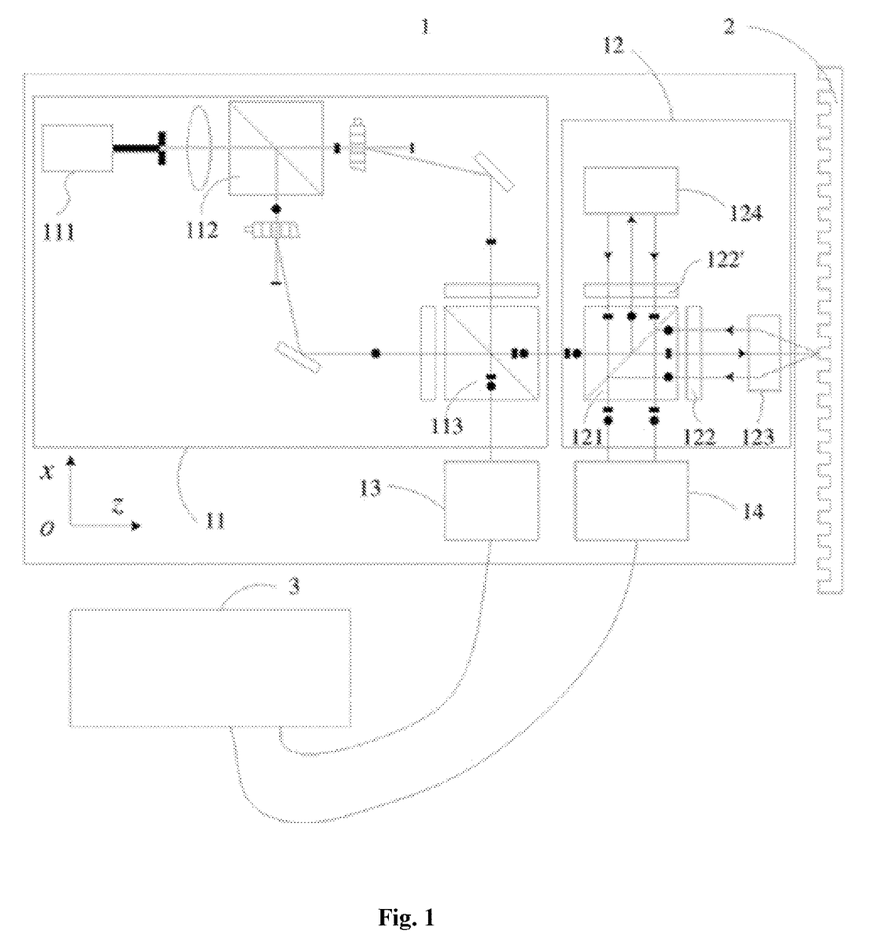
FIG. 1 is a schematic diagram of the structure and principle of an embodiment of a first kind of displacement measurement system of heterodyne grating interferometer of the present invention.

Please refer to FIG. 1 which is a schematic diagram of the structure and principle of an embodiment of a first kind of displacement measurement system of heterodyne grating interferometer of the present invention. As shown in FIG. 1, the displacement measurement system of heterodyne grating interferometer comprises a reading head 1, a measurement grating 2 and an electronic signal processing component 3; the reading head 1 comprises a dual-frequency laser generator 11, an interferometer 12, a reference signal photo-electric conversion unit 13 and a measurement signal photo-electric conversion unit 14; the dual-frequency laser generator 11 comprises a laser tube 111, a first polarization beam splitter 112, an acousto-optic modulator, a reflective mirror, a polaroid and a beam splitter 113; and the interferometer 12 comprises a second polarization beam splitter 121, a wave plate, a refraction element 123 and a reflector 124.

Laser light emitted from the laser tube 111 is collimated, and then passes through the first polarization beam splitter 112, and is split into two light beams with polarization directions orthogonal to each other and propagation directions orthogonal to each other; the two light beams pass through two acousto-optic modulators and respectively generate two first-order diffraction light beams with different frequencies; the two first-order diffraction light beams are reflected by the reflective mirror, pass through the polaroid and reach the beam splitter 113 to be split and then the split light beams are respectively combined; and then, one exit of the beam splitter 113 emits a dual-frequency laser beam onto the reference signal photo-electric conversion unit 13 to form a reference signal, while the other exit emits a dual-frequency laser beam onto a second polarization beam splitter 121.

The dual-frequency laser emitted from one exit of the beam splitter 113 passes through the second polarization beam splitter 121 to be split into reference light and measurement light; the reference light passes through a reference arm ¼ wave plate 122' and is reflected by a reference arm reflector 124 to generate two parallel reference light beams; the two parallel reference light beams pass through the reference arm ¼ wave plate 122' and the second polarization beam splitter 121 to be incident into the measurement signal photo-electric conversion unit 14, respectively; the measurement light passes through a measurement arm ¼ wave plate 122 and a refraction element 123 to be incident onto the measurement grating 2 to be diffracted; positive and negative first-order diffraction measurement light passes through the refraction element 123, the measurement arm ¼ wave plate 122 and the polarization beam splitter 121 to be incident into the measurement signal photo-electric conversion unit 14, respectively; the two parallel reference light beams are combined with positive and negative first-order diffraction measurement light respectively and are converted into beat frequency electric signals by the measurement signal photo-electric conversion unit 14; and the beat frequency electric signals are transmitted to the electronic signal processing component 3 for signal processing; and, when the reading head moves in X and Z directions relative to the measurement grating 2, the electronic signal processing component 3 outputs signals of linear displacements in the two directions.

Figure 2:
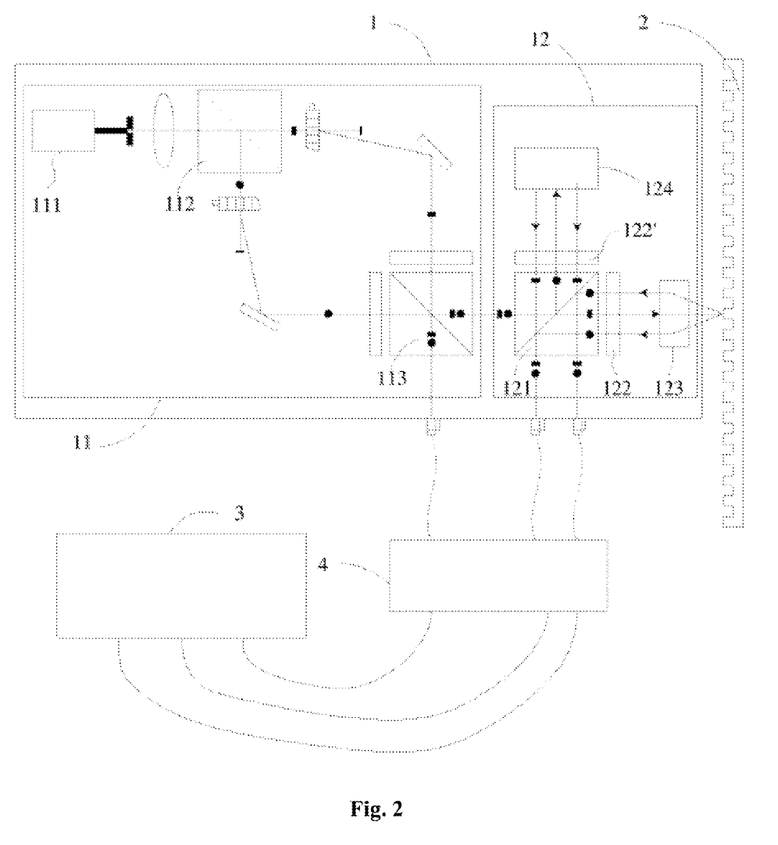
FIG. 2 is a schematic diagram of the structure and principle of an embodiment of a second kind of displacement measurement system of heterodyne grating interferometer of the present invention.

Please refer to FIG. 2 which is a schematic diagram of an embodiment of a second kind of displacement measurement system of heterodyne grating interferometer of the present invention. The reference signal photo-electric conversion unit 13 and the measurement signal photo-electric conversion unit 14 constitute a receiver 4, and the light emitted from the beam splitter 113 and the two parallel light beams emitted from the polarization beam splitter 121 are transmitted to the receiver 4 through optical fiber, respectively. The measurement system which adopts this kind of solution can lower the complexity of interferometer design, and can reduce the size and weight of the interferometer; and, the adoption of the receiver 5 is useful for easier preprocessing of an electric signal after photo-electric conversion and enhances the interference resistance of a system signal.

Figure 3:
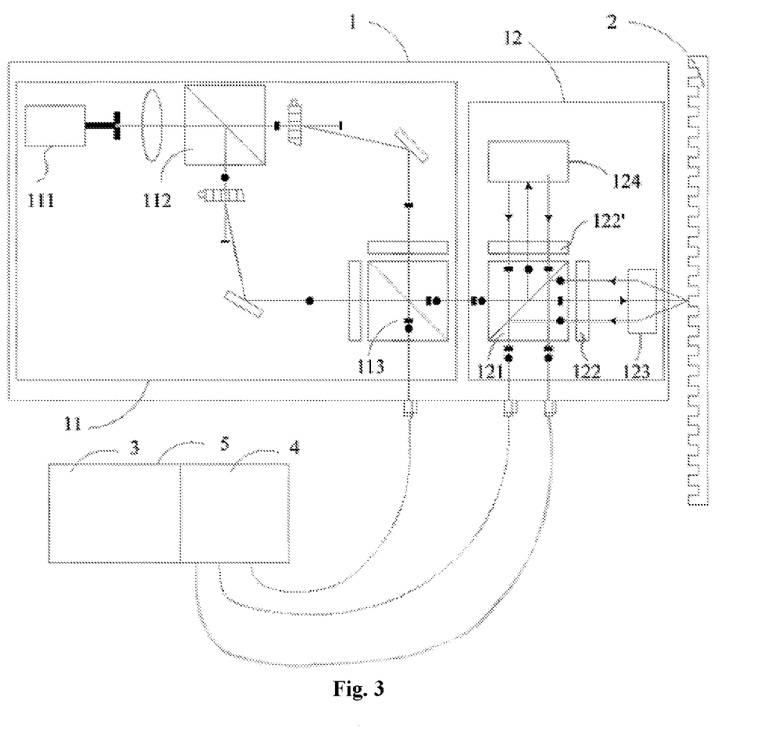
FIG. 3 is a schematic diagram of the structure and principle of an embodiment of a third kind of displacement measurement system of heterodyne grating interferometer of the present invention.

Please refer to FIG. 3, which is a schematic diagram of an embodiment of a third kind of displacement measurement system of heterodyne grating interferometer of the present invention. As shown in FIG. 3, the receiver 4 and the electronic signal processing component 3 form an integral structure 5. The measurement system which adopts this kind of solution can reduce the size and weight of the interferometer, enhance the interference resistance of the system and enhance system integration.

Figure 4:
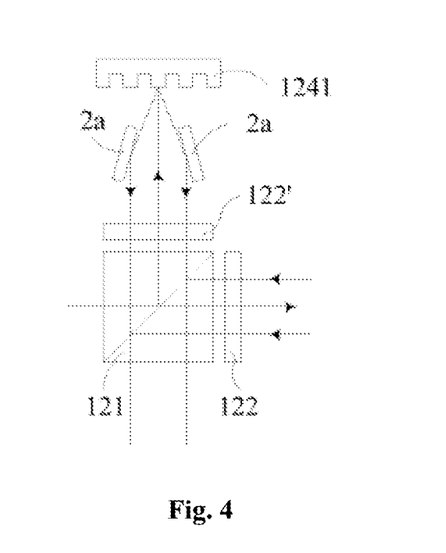
FIG. 4 is a schematic diagram of an embodiment of a first kind of reflector of the present invention.

Please refer to FIG. 4 which is a schematic diagram of an embodiment of a first kind of reflector of the present invention. As shown in FIG. 4, the reflector 124 is composed of a reference gating 1241 and reflective mirrors 2a, and the reference light is incident onto the reference gating 1241 to be subject to diffraction reflection and then reflected by the reflective mirrors 2a to form two parallel light beams.

Figure 5:
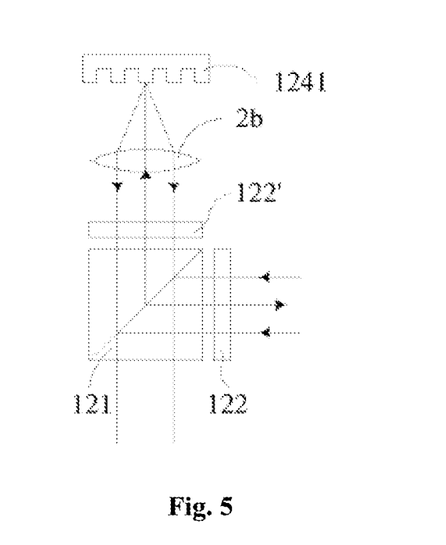
FIG. 5 is a schematic diagram of an embodiment of a second kind of reflector of the present invention.

Please refer to FIG. 5, which is a schematic diagram of an embodiment of a second kind of reflector of the present invention. As shown in FIG. 5, the reflector 124 is composed of a reference gating 1241 and a lens 2b, and the reference light is incident onto the reference gating 1241 to be subject to diffraction reflection and then passes through the lens 2b to form two parallel light beams.

Figure 6:
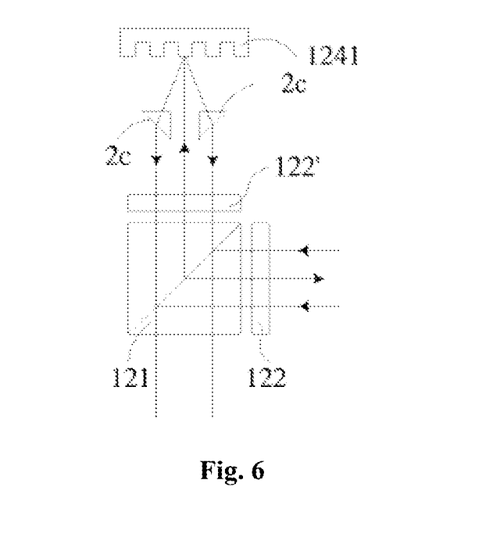
FIG. 6 is a schematic diagram of an embodiment of a third kind of reflector of the present invention.

Please refer to FIG. 6, which is a schematic diagram of an embodiment of a third kind of reflector of the present invention. As shown in FIG. 6, the reflector 124 is composed of a reference gating 1241 and prisms 2c, and the reference light is incident onto the reference gating 1241 to be subject to diffraction reflection and then passes through the prisms 2c to form two parallel light beams.

Figure 7:
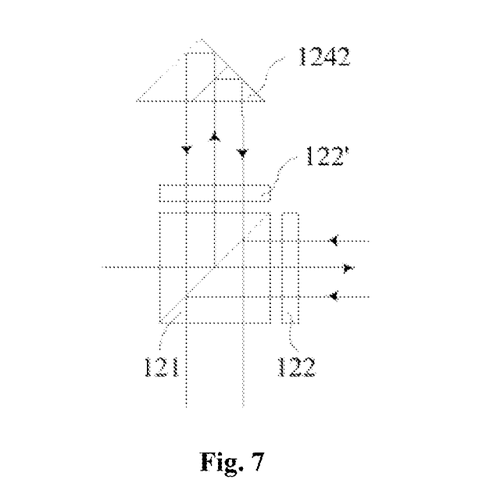
FIG. 7 is a schematic diagram of an embodiment of a fourth kind of reflector of the present invention.

Please refer to FIG. 7, which is a schematic diagram of an embodiment of a fourth kind of reflector of the present invention. As shown in FIG. 7, the reflector 124 comprises a rectangular prism 1242, the cross section of the rectangular prism is composed of a right-angle trapezoid and an isosceles right triangle, the jointing plane between the right-angle trapezoid and the isosceles right triangle is a light splitting plane, the reference light is incident onto the light splitting plane of the rectangular prism 1242 to be split into two light beams, which are reflected by a 45° reflective plane, respectively, to form two parallel light beams.

Figure 8:
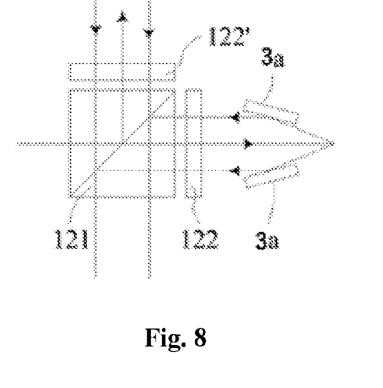
FIG. 8 is a schematic diagram of a first kind of refraction element of the present invention.

Please refer to FIG. 8, which is a schematic diagram of a first kind of refraction element of the present invention. As shown in FIG. 8, the refraction element 123 comprises reflective mirrors 3a.

Figure 9:
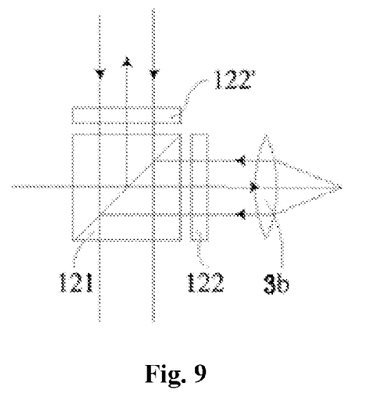
FIG. 9 is a schematic diagram of a second kind of refraction element of the present invention.

Please refer to FIG. 9, which is a schematic diagram of a second kind of refraction element of the present invention. As shown in FIG. 9, the refraction element 123 comprises a lens 3b.

Figure 10:
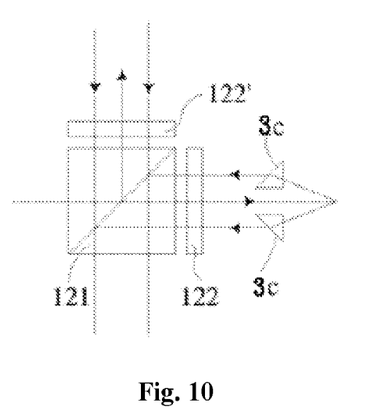
FIG. 10 is a schematic diagram of a third kind of refraction element of the present invention.

Please refer to FIG. 10, which is a schematic diagram of a third kind of refraction element of the present invention. As shown in FIG. 10, the refraction element 123 comprises prisms 3c.

Figure 11:
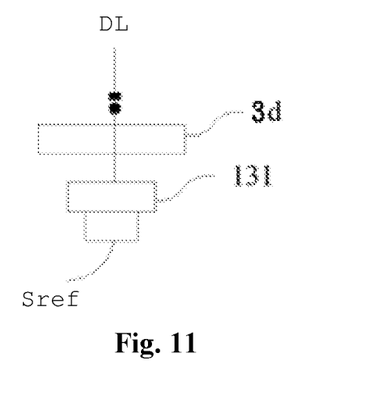
FIG. 11 is a schematic diagram of an embodiment of a reference signal photo-electric conversion unit of the present invention.

Please refer to FIG. 11, which is a schematic diagram of an embodiment of a reference signal photo-electric conversion unit of the present invention. As shown in FIG. 11, the reference signal photo-electric conversion unit 13 is composed of an analyzer 3d and a second photo-electric detection unit 131; and dual-frequency laser DL passes through the analyzer 3d to be incident onto the first photo-electric detection unit 131 to be converted into a reference electric signal Sref.

Figure 12:
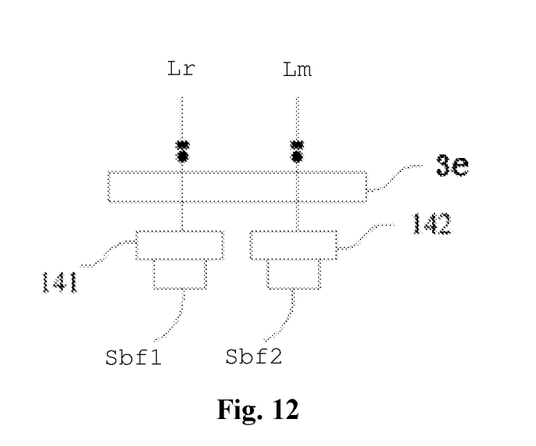
FIG. 12 is a schematic diagram of an embodiment of a measurement signal photo-electric conversion unit of the present invention.

Please refer to FIG. 12, which is a schematic diagram of a measurement signal photo-electric conversion unit of the present invention. As shown in FIG. 12, the measurement signal photo-electric conversion unit 14 is composed of an analyzer 3e, a second photo-electric detection unit 141 and a third photo-electric detection unit 142, and reference light Lr and measurement light LM that are mixed pass through the analyzer 3e to be incident onto the second photo-electric detection unit 141 and the third photo-electric detection unit 142 to be converted into two beat frequency electric signals Sbf1 and Sbf2.

The above mentioned displacement measurement system of heterodyne grating interferometer can not only achieve sub-nanometer or even higher resolution and preciseness, but also can at the same time measure large-stroke horizontal displacement and vertical displacement, and even has such a lot of advantages as small size, light weight and good resistance to environmental change. Its application to displacement measurement of the ultra-precision workpiece table of the lithography machine can enhance the overall performance of the system of the workpiece table, meet the stringent performance requirements of the system of the workpiece table, and contribute to the enhancement of the overall performance of the lithography machine.

The invention claimed is:

1. A displacement measurement system of heterodyne grating interferometer, characterized in that it comprises a reading head (1), a measurement grating (2) and an electronic signal processing component (3);

the reading head (1) comprises a dual-frequency laser generator (11), an interferometer (12), a reference signal photo-electric conversion unit (13) and a measurement signal photo-electric conversion unit (14);

the dual-frequency laser generator (11) comprises a laser tube (111), a first polarization beam splitter (112), a first acousto-optic modulator, a second acousto-optic modulator, a first reflective mirror, a second reflective mirror, a first polaroid, a second polaroid, and a beam splitter (113);

the interferometer (12) comprises a second polarization beam splitter (121), a measurement arm ¼ wave plate (122), a reference arm ¼ wave plate (122'), a refraction element (123), and a reference arm reflector (124), wherein laser light emitted from the laser tube (111) is collimated, and then passes through the first polarization beam splitter (112), and is split into two light beams with polarization directions orthogonal to each other and propagation directions orthogonal to each other; the two light beams pass through the first acousto-optic modulator and the second acousto-optic modulator, respectively, and generate two first-order diffraction light beams with different frequencies; the two first-order diffraction light beams are reflected by the first reflective mirror and the second reflective mirror, respectively, pass through the first polaroid and the second polaroid, respectively, and reach the beam splitter (113) to be split and then the split light beams are respectively combined; and then, one exit of the beam splitter (113) emits a dual-frequency laser beam onto the reference signal photo-electric conversion unit (13) to form a reference signal, while the other exit emits a dual-frequency laser beam onto the second polarization beam splitter (121); and the dual-frequency laser emitted from one exit of the beam splitter (113) passes through the second polarization beam splitter (121) to be split into reference light and measurement light; the reference light passes through the reference arm ¼ wave plate (122') and is reflected by the reference arm reflector (124) to generate two parallel reference light beams; the two parallel reference light beams pass through the reference arm ¼ wave plate (122') and the second polarization beam splitter (121); the measurement light passes through the measurement arm ¼ wave plate (122) and the refraction element (123) to be incident onto the measurement grating (2) to be diffracted; positive and negative first-order diffraction measurement light pass through the refraction element (123), the measurement arm ¼ wave plate (122) and the polarization beam splitter (121); the two parallel reference light beams are combined with the positive and negative first-order diffraction measurement light, respectively, and the two parallel reference light beams combined with the positive and negative first-order diffraction measurement light, respectively, are incident into the measurement signal photo-electric conversion unit (14), and converted to beat frequency electric signals by the measurement signal photo-electric conversion unit (14); and the beat frequency electric signals are transmitted to the electronic signal processing component (3) for signal processing; and, when the reading head (1) moves in X and Z directions relative to the measurement grating (2), the electronic signal processing component (3) outputs signals of linear displacements in the two directions.

2. The displacement measurement system of heterodyne grating interferometer according to claim 1, characterized in that, the reference signal photo-electric conversion unit (13)

and the measurement signal photo-electric conversion unit (14) constitute a receiver (4), and the light emitted from the beam splitter (113) and the two parallel light beams emitted from the polarization beam splitter (121) are transmitted to the receiver (4) through optical fiber, respectively.

3. The displacement measurement system of heterodyne grating interferometer according to claim 2, characterized in that, the receiver (4) and the electronic signal processing component (3) form an integral structure (5).

4. The displacement measurement system of heterodyne grating interferometer according to claim 1, characterized in that, the reflector (124) is composed of a reference gating (1241) and reflective mirrors (2a), and the reference light is incident onto the reference gating (1241) to be subject to diffraction reflection and then reflected by the reflective mirrors (2a) to form two parallel light beams.

5. The displacement measurement system of heterodyne grating interferometer according to claim 1, characterized in that, the reflector (124) is composed of a reference gating (1241) and a lens (2b), and the reference light is incident onto the reference gating (1241) to be subject to diffraction reflection and then passes through the lens (2b) to form two parallel light beams.

6. The displacement measurement system of heterodyne grating interferometer according to claim 1, characterized in that, the reflector (124) is composed of a reference gating (1241) and prisms (2c), and the reference light is incident onto the reference gating (1241) to be subject to diffraction reflection and then passes through the prisms (2c) to form two parallel light beams.

7. The displacement measurement system of heterodyne grating interferometer according to claim 1, characterized in that, the reflector (124) comprises a rectangular prism (1242), the cross section of the rectangular prism is composed of a right-angle trapezoid and an isosceles right triangle, the jointing plane between the right-angle trapezoid and the isosceles right triangle is a light splitting plane, the reference light is incident onto the light splitting plane of the rectangular prism (1242) to be split into two light beams, which are reflected by 45° reflective planes, respectively, to form two parallel light beams.

8. The displacement measurement system of heterodyne grating interferometer according to claim 1, characterized in that, the refraction element (123) comprises reflective mirrors (3a), a lens (3b) or prisms (3c).

9. The displacement measurement system of heterodyne grating interferometer according to claim 1, characterized in that, the reference signal photo-electric conversion unit (13) is composed of an analyzer (3d) and a first photo-electric detection unit (131); and the measurement signal photo-electric conversion unit (14) is composed of an analyzer (3e), a second photo-electric detection unit (141) and a third photo-electric detection unit (142).

* * * * *